United States Patent [19]

Huddleston et al.

[11] Patent Number: 4,997,709

[45] Date of Patent: Mar. 5, 1991

[54] NOVEL ADHESIVES AND TAPES INCLUDING SAME

[75] Inventors: Elwyn Huddleston, Franklin, Ky.; Rajiv Anand, Nashville, Tenn.; Gary R. Robe, Franklin, Ky.

[73] Assignee: The Kendall Company, Lexington, Mass.

[21] Appl. No.: 268,122

[22] Filed: Nov. 7, 1988

[51] Int. Cl.$^5$ .................. B32B 15/06; B32B 15/08; B32B 27/10

[52] U.S. Cl. .................. 428/344; 428/343; 428/355; 428/462; 525/89

[58] Field of Search .................. 525/89, 93, 98; 428/462, 343, 344, 355, 356

[56] References Cited

U.S. PATENT DOCUMENTS

| 4,399,249 | 8/1983 | Bildusas | 523/310 |
| 4,500,021 | 2/1985 | Bildusas | 428/194 |

OTHER PUBLICATIONS

"Kraton Thermoplastics Rubber", Mar. 1987, Shell Chemical Co., pp. 1–41, SC-198-87.

*Primary Examiner*—Allan M. Lieberman

*Attorney, Agent, or Firm*—Margit Maus

[57] ABSTRACT

A pressure-sensitive adhesive meeting Underwriter Laboratories, Inc. 181A requirements and specifications for foil tapes for use with rapid fiberglass air ducts consisting essentially of:

(1) 100 phr of a block copolymer consisting of from 75 to about 100 parts be weight of a styrene-isoprene-styrene triblock copolymer and from 0–25 parts by weight of a member selected from the group consisting of a styrene-isoprene diblock copolymer, a styrene-butadiene-styrene triblock copolymer and a mixture of styrene-isoprene diblock copolymer and styrene-butadiene-styrene triblock copolymer;

(2) from about 60 to about 110 phr of rubber phase associating resin;

(3) from about 5 to about 30 phr of a polyestyrene phase associating resin;

(4) an effective amount of flame retardant;

(5) an effective amount of antioxidant for the rubbery isoprene moiety; and (6) a crosslinking system for crosslinking the isoprene moiety;

and foil tapes including same.

14 Claims, No Drawings

NOVEL ADHESIVES AND TAPES INCLUDING SAME

BACKGROUND OF THE INVENTION

The present invention relates to novel adhesives and, more particularly, to novel adhesives which can be coated onto an aluminum or other metal foil backing material to provide so-called foil tapes which meet the very severe Underwriter Laboratories, Inc. (UL) 181A requirements and specifications for use with rigid fiberglass air ducts.

Foil tapes, e.g. pressure-sensitive or heat-bonded aluminum tapes are of course in the art. It is also heretofore known to employ foil tapes for closure systems for use with factory-made air ducts and connectors. However, recently UL has imposed very severe standards for their usage, both as to adhesive qualities and to flame retardation.

Acrylic adhesives are known in the art which are capable of meeting these severe standards. However, the known acrylic formulations for this purpose suffer from two major deficiencies, namely cost-effectiveness and performance.

With respect to the former, there is a great need by adhesive and adhesive tape manufacturers for an appreciably less expensive foil tape meeting the UL 181A requirements.

As to the latter, acrylics as a class do not always exhibit entirely satisfactory shear performance over long term and at high temperatures. Consequently, there is also a great need for a foil tape having superior performance under these conditions.

The task of the present invention may accordingly be described as three-fold: (1) to manufacture a more cost-effective foil tape (2) which will meet the UL 181A requirements to be described in detail hereinafter (3) and which will provide markedly improved performance over long term and at higher temperature.

The UL 181A specifications detailed hereinafter for pressure-sensitive aluminum tapes for use with rigid fiberglass air ducts require an aluminum or aluminum alloy foil covered on one side with adhesive. The adhesive surface shall be protected by a release paper intended to be removed at the time of tape installation.

1. Tensile Strength Test

The average tensile strength in both the machine and cross-machine directions of each roll of aluminum tape shall be not less than 25 pounds per inch (4.37 N/mm) of width, with no individual specimen having a value of less than 21 pounds per inch (3.67 N/mm) of width, determined in accordance with the Standard Test Method for Tensile Strength and Elongation of Pressure-Sensitive Tapes, ASTM D3759-83. All cross-direction specimens are to be cut from special 6 inch (142.4 mm) wide rolls of tape. Three specimens from each of three separate rolls of tape shall be tested in both the machine and cross-machine directions. The average tensile strength of each set of three specimens shall not be less than 25 pounds per inch (4.37 N.mm) of width, when specimens are prepared with a laboratory specimen cutter.

2. Peel Adhesion at 180 Degree Angle

The average peel adhesion strength of each roll of aluminum tape shall be not less than 3.75 pounds per inch (0.66 N/mm) of width of tape, with no individual specimens having a value of less than 3.20 pounds per inch (0.56 N/mm) of width. The peel adhesion strength of aluminum tape is to be determined in accordance with the Standard Test Methods for Peel Adhesion of Pressure-Sensitive Tape at 180 Degrees Angle, ASTM D3330-83, except as modified hereinafter. Specimens are to be cut in 1 inch (25.4 mm) wide by 12-inch (305 mm) long strips. The tape is to be applied (as specified in ASTM 3330-83) to the specified stainless steel panel with a roller weighing 10 pounds-mass (4.53 kg). The roller is to pass over each specimen five times in each direction. The test load is applied 15 minutes after completion of the rolling.

3-5. Shear Adhesion Test Conditions

The shear adhesion strength of tape shall be such that the tape is able to maintain the test loads specified in Table 1 for the indicated test durations without evidence of separation or slippage in excess 1/32 inch (0.79 mm). The shear adhesion strength of aluminum tape is to be determined in accordance with Procedure C of the Standard Test Method for Holding Power of Pressure-Sensitive Tapes, ASTM D3654-82, except as modified below. After conditioning, a 2-inch (50 mm) length of specimen is to contact the panel. The tape is to be applied to the panel with a roller weighing 10 pounds-mass (4.53 kg). The roller is to pass over each specimen five times in each direction. Using a cutting razor blade or jig, the rolled portion of the specimen is to be trimmed to 1 by 1 inch square on the panel, such that the remaining test specimen measures 1 by 5 inches. The tape is allowed to dwell on the panel for the time specified in Table 1. After dwelling, the clamp is to be placed on the free end of the specimen. The clamp is to extend completely across the width of the specimen and is to be aligned to uniformly distribute the load. The test load specified in Table 1 is then to be applied to the clamp gently so as not to cause any shear impact force on the specimen. The load is to be applied for the test duration time specified in Table 1. The test panel is to be positioned at 2 degrees from the vertical so that the test substrate forms a 178 degree angle with the extended tape specimen. Individual specimens of tape are to be tested in accordance with the conditions as shown in Table 1.

TABLE 1

| | SHEAR ADHESION TEST CONDITIONS | | | | |
|---|---|---|---|---|---|
| Test No. | Application Condition | Dwell Time | Test Condition | Test Load | Duration |
| 3 | 40° F. (4.4° C.) dry substrate | 15 min | 40° F. | 5 lbs (22.2N) | 6 Hours |
| 4 | 73.4° F. (23° C.) 50% RH | 24 hrs | 73.4° F. | 10 lbs | 120 Hours |
| 5 | 73.4° F. 50% RH | 15 min | 150° F. (65.6° C.) | 5 lbs | 6 Hours |

6. Peel Adhesion Test at 20 Degrees Angle

Aluminum tape specimen shall support a load of 2 pounds (8.9 N) for a period of 24 hours when tested as specified below. Test specimens are to be prepared as described in the Peel Adhesion Test at 180 degrees. Test specimens are to be prepared and tested under ambient conditions of 73° F. (23° C.) and 50 percent relative humidity (RH). A test stand is to be positioned so that the test panel forms a 20 degree angle with the vertical. The length of the tape adhered to the test panel is to be at least 7 inches (178 mm). The free end of the tape specimen is to be located at the bottom end of the test panel with the test load applied at the free end of the tape specimen.

7. Surface Burning Characteristics Test

Aluminum tape of the maximum width recommended by the manufacturer shall have a flame-spread rating of not over 25 without evidence of continued progressive combustion and a smoke-developed rating of not over 50 when applied to rigid fiberglass board and tested in accordance with the Tests for Surface Burning Characteristics as specified in the Standard for Factory-Made Air Ducts and Connectors, UL 181. One strip of tape is to be applied to a 24-inch (610 mm) wide rigid fiberglass duct board that complies with the Standard for Factory-Made Air Ducts and Connectors, UL 181. The duct board is to be Type "475" and covered with a foil/scrim/Kraft paper facing material. The tape is to be applied to a longitudinal butt joint in the center of the substrate formed by slitting the facing. The tape is to be applied to the substrate in accordance with the recommended field application instructions.

8. Burning Test

Aluminum tape shall not flame or glow for more than 60 seconds after withdrawal of a test flame when tested as described below. Flaming or glowing shall not travel to the end of the test specimen of tape opposite that at which the flame is applied anytime during or within 60 seconds following withdrawal of the flame. Any particles dropping from the tape specimens oriented horizontally and at a 45 degree angle shall not ignite untreated surgical cotton. Three specimens from one roll of tape are to be tested. The tape specimens are to be applied to an aluminum-fiberglass laminated board substrate with a mechanically operated roller weighing 10 pounds-mass (4.53 kg). The roller is to pass over each specimen five times in each direction. The dwell time is to be 15 minutes. The test is to be conducted in accordance with the method described in the Standard for Factory-Made Air Ducts and Connectors, UL 181, except as follows:

A. The Tape is to be applied to an aluminum-fiberglass laminated board substrate at least 2 inches (50.8 mm) wider on each side than the tape specimen and 36 inches (914 mm) long.

B. The tape is to be 30 inches (762 mm) long and applied so that each end is 3 inches (76.2 mm) from the end of the substrate.

C. One tape specimen from the roll is to be supported with its axis horizontal, one supported with the axis at 45 degrees from the horizontal and one supported with the axis vertical.

In addition to the tests described above, UL 181A also imposes other requirements, e.g. a mold growth and humidity test and a temperature/pressure cycling test. However, these additional tests are readily passed and accordingly need not be discussed in any detail for purposes of understanding the present invention.

BRIEF DESCRIPTION OF THE INVENTION

In accordance with the present invention, the aforementioned task is solved by providing an adhesive formulation consisting essentially of:

(1) 100 phr of a block copolymer consisting of: from 75 to 100 parts by weight of styrene-isoprene-styrene (S-I-S) and from 0–25 parts by weight of styrene-isoprene (S-I), styrene-butadiene-Styrene (S-B-S) or a mixture of S-I and S-B-S;

(2) from about 60 to about 110 phr, preferably from about 70 to about 100 phr, of a rubber phase associating resin or mixture of such resins (i.e. a midblock modifier);

(3) from about 5 to about 30 phr, preferably from about 10 to about 20 phr, of a polystyrene phase associating resin (end block modifier);

(4) an effective amount of flame retardant or mixture of flame retardants;

(5) an effective amount of antioxidant or mixture of antioxidants for the rubbery isoprene moiety; and (6) a crosslinking system, i.e. crosslinking agent, activator and accelerator, for crosslinking the isoprene moiety.

DETAILED DESCRIPTION OF THE INVENTION

As stated previously, the present invention is directed to a novel cost-effective and efficient pressure-sensitive adhesive formulation meeting UL 181A requirements and specifications; and to foil tapes including same.

In lieu of employing acrylics, which are significantly more costly and do not always perform well when subjected to long term high temperatures, the present invention employs an S-I-S rubbery triblock copolymer as the primary component along with associating resins, flame retardant(s), antioxidant(s), and crosslinker for the rubbery component, as detailed in the formulation disclosed in the "BRIEF DESCRIPTION OF THE INVENTION".

It will be noted that the amounts of the individual ingredients are expressed in "phr" (parts per hundred rubber) according to conventional rubber technology nomenclature, rather than in percentage by weight of the total solids content. This is due to the fact that in rubber chemistry it is more relevant to express the amount of additives by weight to the weight of the rubber component, which the additives modify, than it is to express the amount by weight to the total weight of the mixture including reactants, modifiers, inert materials such as fillers, colorants, and the like.

The major ingredient, the S-I-S triblock is well known in the literature, the uses of which include rubber-based adhesives. Illustrative polymers of this description include those of the Kraton D grades commercially available from Shell Chemical Company, e.g. those set forth in Table 2 hereinbelow.

TABLE 2

| STYRENE-ISOPRENE-STYRENE TRIBLOCK COPOLYMERS | |
|---|---|
| Polymer | Styrene/Rubber Ratio |
| Kraton D-1107 | 14/86 |
| D-1111 | 21/79 |
| D-1112 | 14/86 |
| D-1117 | 17/83 |

The S-I-S triblock may be employed as the only rubber component in the formulation or as much as 25% by weight of the S-I-S may be replaced by the triblock elastomer S-B-S and/or the diblock elastomer S-I.

S-B-S triblocks are also well known in the literature, the uses of which include adhesive formulations.

Illustrative triblock copolymers of this description also include those of the Kraton D Series from Shell Chemical Company, e.g. those set forth in the following Table 3.

TABLE 3

| STYRENE-BUTADIENE-STYRENE TRIBLOCK COPOLYMERS | | |
|---|---|---|
| Polymer | | Styrene/Rubber Ratio |
| Kraton | D-1101 | 31/70 |
| | D-1102 | 28/72 |
| | Dx-1115 | 38/62 |
| | D-1116 | 21/79 |
| | D-1184 | 30/70 |
| | Dx-1300 | 17/83 |
| | D-4122 | 48/52 |
| | D-4141 | 31/70 |
| | D-4150 | 30/70 |
| | Dx-4240 | 44/56 |

Other useful block copolymers include those of the "Stereon" (Fires-one) and "Europrene" (Enichem) families.

Since the S-I optional rubbery diblock is not directly available commercially, a particularly useful method of incorporating this component is by utilization of an S-I-S triblock such as Kraton D-1112, which is a mixture of 60% by weight S-I-S and 40% S-I, in admixture with another S-I-S triblock to obtain the desired level of up to 25% S-I.

The novel adhesive formulations of this invention also include specified amounts of rubber phase associating resin and polystyrene phase associating resin for reasons which will be described in more detail hereinafter.

Suitable rubber phase associating resins include polymerized mixed olefin resins such as "Super Sta-Tac" (Reichhold); Quintone Series (Nippon Zeon); Nevtac Series (Neville); Piccotac 95-BHT Series (Hercules); "Escorez" 2101 (Exxon); Wingtack Series (Goodyear); Escorez 1300 Series (Exxon); Super Nevtac 99 (Neville); Piccotac B (Hercules); Sta Tac/R (Reichhold); Hercotac AD (Hercules); and "Betaprene" BC (Reichhold); Polyterpene resins such as Zonarez 7000 Series (Arizona); Zonatac Series (Arizona); Nirez 1000 Series (Reichhold); Piccofyn A-100 (Hercules); Nirez V-2040 (Reichhold); Piccolyte HM 110 (Hercules); Piccolyte A (Hercules); rosin esters such as Sylvatac Series (Sylvachem); Super Ester A Series (Arakawa); Stabelite Ester 10 (Hercules); Foral 85 (Hercules); "Zonester" Series (Arizona); Foral 105 (Hercules); and Pentalyn H (Hercules); and hydrogenated hydrocarbon resins such as Escorex 5000 Series (Exxon); Arkon P Series (Arakawa); "Regalrez" Series (Hercules) and "Super Nirez 5000" Series (Reichhold). Preferred are the polymerized mixed olefin resins.

Useful polystyrene phase associating resins include coumarone indene resins such as Cumar Series (Neville) and Cumar LX-509 (Neville) hydrocarbon resins such as Picco 6000 Series (Hercules); Nevchem Series (Neville); and LX 685 Series (Neville); alphamethyl styrene resins such as Piccotex Series (Hercules); Kristalex Series (Hercules) and Amoco 18 Series (Amoco); and polystyrene resins such as Piccolastic D-150 (Hercules) and LX 1035 (Neville). Preferred are the coumarone indene resins.

The novel adhesive formulations also include an antioxidant for the isoprene (midblock) moiety. Suitable antioxidants include any or those heretofore employed in natural rubber formulations. A preferred antioxidant is Irganox 1010(trademark of Ciba-Geigy) a hindered phenolic, CAS Number: 6683-19-8, Empirical Formula: $C_{73}H_{108}O_{12}$. Other useful antioxidants will be readily suggested to those skilled in the art, e.g. other hindered phenolics such as "Irganox" 565 (Ciba-Geigy); Antioxidant 330 (Ethyl Corp.), Cyanox 2246 (American Cyanamid), "Vanox" 2246 (R.T. Vanderbilt) and cresol antioxidants such as Santowhite crystals (Monsanto); phosphite antioxidants such as "Polygard" (Uniroyal Chemical Co.) and "Westin" 618 (Borg-Warner); and Zinc dibutyl dithiocarbamates such as "Butyl Zimate" (R.T. Vanderbilt Co.) and "Butazate" (Uniroyal Chemical Co.).

As used herein and in the appended claims, the term "effective amount of antioxidant" denotes an amount effective or sufficient to prevent the degradative oxidation of the isoprene moiety such as could occur during the tape manufacturing process, e.g. by heat to remove solvent in a solution-coating procedure or the heat inherent in extrusion coating techniques, as well as during its useful life. The precise amount to be effective for this purpose will in part be dependent upon the antioxidant selected and will in part be dependent upon the materials to be protected from oxidation. However, by way of illustration, useful results are obtained with amounts ranging from about 0.2 to about 3.0 phr, with amounts on the order of about 0.5 to about 1.5 being preferred.

The adhesive formulations further include an effective amount of a chemical crosslinking system for the isoprene moiety to improve cohesive strength and performance at high temperature. This may include any of the crosslinking agents heretofore employed to chemically crosslink rubber, sulfur or sulfur donor crosslinking agents being preferred. A preferred crosslinker is "Tetrone A" (duPont) which yields approximately 25% sulfur. Other useful crosslinking agents known and used in the rubber art will also be suggested, e.g. phenolic resin crosslinkers, p-quinone dioxime, p-dinitrosobenzene, etc. Typically, the crosslinking system will also include at least an activator, e.g. zinc oxide or lead dioxide and, preferably will also include an accelerator. Useful types of accelerators include the thiazoles, dithiocarbamates, thiuram sulfates and guanidines, dithiocarbamates ultra accelerators such as "Butyl 8" (R.T. Vanderbilt) being preferred.

As used herein and in the appended claims, the term "effective amount" as applied to the chemical crosslinking system means an amount sufficient to effect at least partial crosslinking of the rubber midblock. Again, the precise amount will in part be dependent upon the efficiency of the crosslinking agent and will in part be dependent upon the material to be crosslinked. Accordingly, it does not lend itself to precise quantification. However, by way of illustration, when employing the preferred sulfur donor crosslinking system, crosslinking agent on the order of from about 0.01 to 2.0 phr, preferably 0.05 to 0.8 of crosslinking agent in combination with from about 2 to about 10 phr of activator and 0.1 to 5.0 of accelerator have been found to be particularly satisfactory.

The aforementioned materials constitute the essential ingredients from the standpoint of performance for meeting the stringent UL181 adhesive requirements.

Finally, the novel adhesives of this invention will include an effective amount of flame retardant, i.e. an amount of one or more flame retardants necessary to provide to the formulation at least sufficient flame retardation to meet the UL 181A flame and burn tests, as previously described. Typically, the amount of added flame retardant will be on the order of from about 10 to about 60 phr.

In general, any of the known flame retardants for use in adhesive tape formulations may be employed. The list of useful flame retardants for this purpose includes antimony trioxide, Firebrake ZB, tricresyl phosphate, triphenyl phosphate, tetrabromophthalic anhydride and hexabromobenzene. A particularly efficacious system trioxide and equal parts of hydrated alumina.

As was previously mentioned, the triblock copolymers which are employed in the practice of this invention are well known and are described in various publications such as "KRATON THERMOPLASTIC RUBBER", Trade Publication SC-198-87 of Shell Chemical Company, apparently printed in March, 1987.

It is there stated that the "KRATON" (trademark of Shell Chemical Company) thermoplastic rubber polymers are a unique class of rubbers designed for use without vulcanization. They differ fundamentally in molecular structure from the typical plastic or commercial rubber (homopolymers or random copolymers) in that they are triblock copolymers with an elastomeric block in the center and a thermoplastic block on each end. The polystyrene is a thermoplastic with a glass transition temperature above room temperature, 200° F., and the elastomeric block is a rubber with a glass transition temperature well below room temperature. The polystyrene end blocks and the elastomeric midblock are thermodynamically incompatible. Because of this incompatibility, the polystyrene endblocks, being in minor proportion, unite to form submicroscopic particles, referred to as polystyrene domains, and are uniformly distributed throughout the mass or film. This creates a crosslinked network similar to that of vulcanized polybutadiene, natural rubber or styrene-butadiene rubber.

Because of the two-phase nature of the triblock, S-I-S, the major rubber component, if not the only rubber component employed in the novel adhesives of this invention, its physical properties can be modified by adding phase-associating ingredients. The rubber phase and polystyrene phase associating resins and in the recited ranges employed in the practice of this invention are utilized for just this purpose, namely to modify the formulation in order to tailor it to meet the UL 181A specification and requirements.

With homopolymers such as polyisoprene or random copolymers such as styrene-butadiene rubber, additives have only one phase with which to interact. However, with the aforementioned triblock copolymers, additives have two phases with which to interact. Possible interactions can include an association of the additive with the rubber network (midblock), with the polystyrene domains (end blocks), with both phases, or with neither phase. For example, low temperature performance may be modified by the addition or ingredients which associate with the rubber phase. On the other hand, their high temperature performance may be modified by the ingredients which associate with the polystyrene phase. Since high temperature performance depends on maintaining the integrity of the polystyrene domains, and since a combination of applied stress and high temperature is needed to rapidly disrupt the domains, maximum service temperature for a given product will depend upon the stress exerted. High temperature performance can be enhanced through addition of high melting point ingredients which can associate with the polystyrene phase.

In accordance with the present invention, a critical point upon which patentability is predicated is the modification of both the rubber and polystyrene phases by incorporating the recited amounts of resins which will selectively associate with one phase or the other to give the desired function, namely meeting UL 181A specifications and requirements.

Illustrative resins for this purpose have previously been described in detail.

However, if one skilled in the art and desiring to practice this invention is uncertain whether a particular resin of choice will have an affinity for either of the phases or neither of them, it is to be noted that it is possible to determine with which phase a particular resin associates by observing changes in the stress-strain properties of the triblock rubber compound in which it is used. A resin which dissolved solely in the polystyrene end block phase will produce a nontacky, hard material. Another resin, similar in superficial characteristics but which dissolves solely in the rubber phase will produce an extremely sticky, soft flexible composition.

The stress-strain behavior of the triblock/resin mixture also indicates the resin's tendency to associate with one phase or the other. A resin which associates with the polystyrene domains causes an increase in the volume fraction of these domains, compared to the volume fraction of the rubber phase. Conversely, resins that associate preferentially with the rubber phase increase the volume of the rubber phase with a corresponding decrease in volume fraction of the polystyrene domains.

The methods for preparing the novel formulations and for coating them onto the roil backing to prepare the contemplated tapes per se comprise no part of this invention and will be within the expected judgement of the skilled worker. This may, for example, be accomplished by solution processing wherein both the polystyrene domains and the rubber network are dissolved in a suitable solvent. This can be done with many common hydrocarbon solvents.

For example, a toluene/heptane solvent may be employed to provide a solution containing on the order of 50% solids by weight. In known manner, this solution may be cast onto a moving web of foil backing followed by passing through a heating station to remove the solvent and then applying to the coated surface of the resulting tape web a suitable release sheet per se common to the adhesive art. The resulting web may then be slit to the desired length and width dimensions and wound onto individual cores for packaging and distribution.

Alternatively, the formulation may be prepared in an internal mixer, e.g. a Banoury or cavity transfer mixer and then applied to the foil backing by per se known extrusion coating or calendering techniques which need not be described in further detail.

Other methods of preparation may readily be suggested to those skilled in the art in the light of the foregoing discussion.

The following example show by way of illustration and not by way of limitation the practice of this invention.

EXAMPLE 1

The following composition was added, with stirring, to an equal part by weight of toluene:

|  | PHR |
| --- | --- |
| "Kraton" 1107 S-I-S | 100.0 |
| Sb₂O₃ flame retardant | 20.0 |
| Hydrated alumina flame retardant | 20.0 |
| "Irganox" 1010 antioxidant | 1.0 |
| "Escorez" 1304 resin | 80.0 |
| "Cumar" LX 509 resin | 20.0 |
| Zinc oxide activator | 5.0 |
| "Tetrone A" sulfur donor x-linker | 0.8 |
| "Butyl 8" accelerator | 2.0 |

The resulting mixture was coated onto an aluminum foil backing material, dried at room temperature for five minutes and then at 150° F. for an additional five minutes to remove the solvent and provide an adhesive coating approximately 2 mils thick.

EXAMPLE 2

Example 1 was repeated, changing the amount of Escorez 1304 resin for the isoprene midblock from 80 phr to 90 phr.

EXAMPLE 3

Example 1 was repeated, changing the amount of Escorez 1304 resin from 80 phr to 70 phr.

EXAMPLE 4

Example 1 was repeated, changing the amount of the Tetrone A crosslinking agent from 0.8 to 0.6 phr.

EXAMPLE 5

Example 4 was repeated, changing the amount of crosslinking agent to 0.2 phr.

EXAMPLE 6

As a control, the following composition was prepared and coated in the manner described in Example 1 to provide a foil tape of the same 2-mil adhesive thickness:

|  | PHR |
| --- | --- |
| "Kraton" 1107 | 100.0 |
| "Irganox" 1010 | 1.0 |
| "Escorez" 1304 | 80.0 |
| "Cumar" LX 509 | 20.0 |

As seen, both the flame retardants and crosslinking system were deleted in the control.

The foil tapes prepared in the foregoing examples were subjected to the aforementioned UL 181A tests (2)-Peel Adhesion; (4)-Shear Adhesion at 150° F.; (7)-Surface Burning; and (8)-Burning.

They were not given the other UL 181A tests because long previous experience has shown that if a specimen passes the peel adhesion (2) and the severe shear adhesion (4) tests, it can be stated unequivocally and with absolute certainty they will pass the remaining adhesive tests. Accordingly, for the sake of expediency, these other tests were not run.

The test results are set forth in the following table:

TABLE 4

| FOIL TAPE (Example #) | UL 181A TEST RESULTS | | | |
| --- | --- | --- | --- | --- |
|  | PEEL ADHESION (lbs/in) | SHEAR-150° F. (slippage) | BURN-ING | BURN |
| 1 | 5.75 | 1/64" | Pass | Pass |
| 2 | 5.87 | 2/64" | Pass | Pass |
| 3 | 5.50 | 2/65" | Pass | Pass |
| 4 | 5.00 | 1/64" | Pass | Pass |
| 5 | 4.56 | 0 | Pass | Pass |
| 6 (Control) | 7.19 | 1/64" | Fail | Fail |

Since all of the test materials passed the critical tests, Applicant's can stare with a certainty these formulations will pass the remaining tests and thus meet UL 181A requirements.

It will be seen that while the control will pass all of the adhesive tests, it will not pass the burn tests, indicating the criticality of the flame retardant additive.

The control demonstrated superior peel adhesion performance, indicating that the missing additives tend to lower peel adhesion performance. It is therefore entirely predictable that when assessing candidates for UL 181A in accordance with this invention, if the peel adhesion is close to a marginal pass without the flame retardants, their addition may result in failure of this test.

What is claimed is:

1. An adhesive tape comprising a sheet material carrying on one surface thereof a layer of adhesive consisting essentially of:
   (1) 100 phr of a block copolymer consisting of about 75 to about 100 parts by weight of a styrene-isoprene-styrene triblock copolymer and from 0-25 parts by weight of a member selected from the group consisting of a styrene-isoprene diblock copolymer, a styrene-butadiene-styrene triblock copolymer and a mixture a styrene-isoprene diblock copolymer and styrene-butadiene-styrene triblock copolymer;
   (2) from about 60 to about 110 phr of rubber phase associating resin selected from the group consisting of polymerized mixed olefin resins, polyterpene resins, rosin esters or hydrogenated hydrocarbon resins.
   (3) from about 5 to about 30 phr of a polystyrene phase associating resin;
   (4) an effective amount of flame retardant;
   (5) an effective amount of antioxidant for the rubbery isoprene moiety; and
   (6) a crosslinking system in an amount sufficient to effect at least partial crosslinking of the isoprene moiety.

2. An adhesive tape comprising a sheet material carrying on one surface thereof a layer of adhesive consisting essentially of:
   (1) 100 phr of a block copolymer consisting of about 75 to about 100 parts by weight of a styrene-isoprene-styrene triblock copolymer and from 0-25 parts by weight of a member selected from the group consisting of a styrene-isoprene diblock copolymer, a styrene-butadiene-styrene triblock copolymer and a mixture of styrene-isoprene diblock copolymer and styrene-butadiene-styrene triblock copolymer;
   (2) from about 60 to about 100 phr of rubber phase associating resin selected from the group consisting of polymerized mixed olefin resins, polyterpene resins, rosin esters or hydrogenated hydrocarbon resins.

(3) from about 10 to about 20 phr of a polystyrene phase associating resin;

(4) an effective amount of flame retardant;

(5) an effective amount of antioxidant for the rubbery isoprene moiety; and (6) a crosslinking system in an amount sufficient to effect at least partial crosslinking of the isoprene moiety.

3. A metal foil tape meeting Underwriters Laboratories criteria for use with fiberglass air ducts, said tape comprising a metal foil backing sheet carrying a layer of an adhesive composition consisting essentially of:

(1) 100 phr of a block copolymer consisting of about 75 to about 100 parts by weight of a styrene-isoprene-styrene triblock copolymer and from 0–25 parts by weight of a member selected from the group consisting of a styrene-isoprene diblock copolymer, a styrene-butadiene-styrene triblock copolymer and a mixture of styrene-isoprene diblock copolymer and styrene-butadiene-styrene triblock copolymer;

(2) from about 70 to about 100 phr of rubber phase associating resin selected from the group consisting of polymerized mixed olefin resins, polyterpene resins, rosin esters of hydrogenated hydrocarbon resins.

(3) from about 10 to about 20 phr of a polystyrene phase associating resin;

(4) an effective amount of flame retardant;

(5) an effective amount of antioxidant for the rubbery isoprene moiety; and (6) a crosslinking system in an amount sufficient to effect at least partial crosslinking of the isoprene moiety.

4. A metal foil tape as defined in claim 3 wherein said block copolymer consists of 100 parts by weight of styrene-isoprene-styrene triblock copolymer.

5. A metal foil tape as defined in claim 3, wherein said rubber phase associating resin comprises a polymerized mixed olefin resin.

6. A metal foil tape as defined in claim 3 wherein said polystyrene phase associating resin comprises a coumarone indene resin.

7. A metal foil tape as defined in claim 3 wherein said crosslinking system comprises a sulfur or sulfur donor crosslinking agent.

8. A metal foil tape as defined in claim 7 wherein said crosslinking system further includes a crosslinking activator and a crosslinking accelerator.

9. A metal foil tape meeting Underwriters Laboratories criteria for use with fiberglass air ducts, said tape comprising a metal foil backing sheet carrying a layer of an adhesive composition consisting essentially of:

(1) 100 phr of a block copolymer consisting of about 75 to about 100 parts by weight of a styrene-isoprene-styrene triblock copolymer and from 0–25 parts by weight of a member selected from the group consisting of a styrene-isoprene diblock copolymer, a styrene-butadiene-styrene triblock copolymer and a mixture of styrene-isoprene diblock copolymer and styrene-butadiene-styrene triblock copolymer;

(2) from about 70 to about 100 phr of rubber phase associating resin selected from the group consisting of polymerized mixed olefin resins, polyterpene resins, rosin esters or hydrogenated hydrocarbon resins;

(3) from about 10 to about 20 phr of a polystyrene phase associating resin;

(4) an effective amount of flame retardant;

(5) an effective amount of antioxidant for the rubbery isoprene moiety; and (6) a crosslinking system in an amount sufficient to effect at least partial crosslinking of isoprene moiety.

10. A metal foil tape as defined in claim 9 wherein said block copolymer consists of 100 parts by weight of styrene-isoprene-styrene triblock copolymer.

11. A metal foil tape as defined in claim 9 wherein said rubber phase associating resin comprises a polymerized mixed olefin resin.

12. A metal foil tape as defined in claim 9 wherein said polystyrene phase associating resin comprises a coumarone indene resin.

13. A metal foil tape as defined in claim 9 wherein said crosslinking system comprises a sulfur or sulfur donor crosslinking agent.

14. A metal foil tape as defined in claim 13 wherein said crosslinking system further includes a crosslinking activator and a crosslinking accelerator.

* * * * *